(12) United States Patent
Moers

(10) Patent No.: US 7,494,627 B2
(45) Date of Patent: Feb. 24, 2009

(54) DEVICE AND METHOD FOR THE OPTIMIZATION OF THE INJECTION OF REACTANTS INTO A REACTOR

(75) Inventor: Marc Moers, Antwerp (BE)

(73) Assignee: TOTAL Petrochemicals Research Feluy, Feluy (BE)

( * ) Notice: Subject to any disclaimer, the term of this patent is extended or adjusted under 35 U.S.C. 154(b) by 251 days.

(21) Appl. No.: 11/503,344

(22) Filed: Aug. 9, 2006

(65) Prior Publication Data

US 2008/0038158 A1 Feb. 14, 2008

(51) Int. Cl.
*B01J 19/18* (2006.01)
(52) U.S. Cl. ..................................... 422/132
(58) Field of Classification Search ............. 422/132
See application file for complete search history.

(56) References Cited

U.S. PATENT DOCUMENTS 4,519,423 A * 5/1985 Ho et al. ..................... 137/888
4,698,211 A * 10/1987 Storey et al. ................. 422/135
5,405,283 A * 4/1995 Goenka ........................ 451/39
5,977,251 A * 11/1999 Kao et al. ...................... 525/53
2004/0147623 A1* 7/2004 Front Freide ................ 518/726

FOREIGN PATENT DOCUMENTS

EP 1316566 A2 * 6/2003

* cited by examiner

*Primary Examiner*—Walter D Griffin
*Assistant Examiner*—Natasha Young
(74) *Attorney, Agent, or Firm*—Tenley R. Krueger

(57) ABSTRACT

The present invention relates to an injector nozzle defining a passage for a flow of reactants to be injected into a loop reactor suitable for olefin slurry polymerization, consisting essentially of a fluid conduit extending into a discharge orifice portion to be connected to an opening in the reactor wherein the passage of the discharge orifice portion has a non-circular cross-section and the passage of the fluid conduit has a circular cross-section. The invention also relates to the use of the injector nozzle for injecting reactants into a loop reactor suitable for olefin polymerization reaction, wherein said injector nozzle is connected on an inner three quarter circle on or above an elbow section of the reactor.

21 Claims, 5 Drawing Sheets

DEVICE AND METHOD FOR THE OPTIMIZATION OF THE INJECTION OF REACTANTS INTO A REACTOR

FIELD OF THE INVENTION

The present invention relates to improvement in the injection of reactants into a reactor for olefin slurry polymerization. More in particular the present invention relates in a first aspect to the design of an injector nozzle for injecting reactants into a loop reactor suitable for olefin slurry polymerization process. In another aspect, the invention relates to the use of an injector nozzle for injecting reactants into a loop reactor suitable for olefin polymerization.

BACKGROUND OF THE INVENTION

Olefin polymerizations such as ethylene polymerization are frequently carried out using monomer, diluent and catalyst and optionally co-monomers and reaction additives like anti-fouling in a loop reactor. The polymerization is usually performed under slurry conditions, wherein the product consists usually of solid particles and is in suspension in a liquid medium containing diluent, monomer and the optional co-monomer and reaction additives (in short the diluent). The slurry content of the reactor is circulated continuously with a pump to maintain efficient suspension of the polymer solid particles in the liquid diluent, the product being often taken off by means of settling legs, which often operate on a batch principle to recover the produce when the reactor is the sole reactor of the polymerization process or when it is the last reactor of a series of reactors in the polymerization process, the product is further discharged to a flash tank, through flash lines, where most of the diluent and unreacted monomers are flashed off and recycled. The polymer particles are dried, additives can be added and finally the polymer is extruded and pelletized. When the reactor is in series with at least another consecutive reactor in the process of polymerization, the product is further discharged to a transfer line in connection with said other reactor. This technique has enjoyed international success with millions of tons of ethylene polymers being so produced annually.

Reversing the definition of residence time, the production of a polymer from a given reactor can be described as the ratio between the quantity of polymer contained in the reactor to the polymer average residence time in the reactor. Well-known methods to increase production often imply the reduction of the residence time, which unfortunately modifies the properties of the polymer. Other ways to increase production are associated with the increase of polymer quantity in the reactor, this means for a given fixed reactor size, the concentration of solids in the reactor.

Commercial production of olefin polymers such as ethylene polymers in isobutane diluent has historically been limited to a maximum solids concentration in the reactor of 37-40 weight % for high density ethylene polymers with values as high as 42-46 weight % possible with several process enhancements. Above the mentioned concentration levels, instabilities arise inside the reactor and force to reduce the solids concentration. Whatever the maximum for a given set of process conditions, improvement in solids concentration is still required.

In homogeneities inside the reactor are detrimental to the achievable production because instabilities tend to be initiated locally at the high concentration locations and then do propagate inside the whole reactor.

It is therefore an object of the present invention to improve the homogeneity of the slurry circulating inside the reactor. It is another object of the present invention to increase the solids content of polymer in the reactor. It is yet a further object to optimize the distribution and mixing of the reactants of a polymerization reaction in a reactor.

SUMMARY OF THE INVENTION

One or more of these objects are achieved by the devices and methods according to the present invention.

In a first aspect, the present invention relates to the design of an injector nozzle defining a passage for a flow of reactants to be injected into a loop reactor suitable for olefin slurry polymerization, consisting essentially of a fluid conduit extending into a discharge orifice portion to be connected to an opening in the reactor wherein the passage of the discharge orifice portion has a non-circular cross-section and the passage of the fluid conduit has a circular cross-section.

The present invention also relates to the use of an injector nozzle for injecting reactants into a loop reactor suitable for olefin polymerization reaction, wherein the injector nozzle is connected on an inner three quarter circle on or above an elbow section of the reactor.

The injector nozzle according to the present invention provides the advantage of optimally injecting reactants into a loop reactor. The present injector nozzle provides the possibility of maximizing the dispersion, and allows optimized injection and mixing of the reactants into the region surrounding the injector nozzle.

In another aspect the present invention relates to a suitable position for an injector nozzle for injecting reactants into an olefin slurry loop reactor.

An influence of the position of the injection nozzle could explain some of the limits previously observed in the production of polymer products. Whilst not wishing to be bound by a theory, inadequate positioning of an injector nozzle on a section of a reactor may create a zone of high reaction rate and a local hot spot. For example, some of the production problems may result from the injection of the reactants into an inadequate zone drastically locally boosting the reactivity in a limited volume of the flowing slurry.

The determination of a suitable position for an injector nozzle on said reactor is important with respect to the distribution and the mixing pattern of the injected reactants. Similarly optimizing the geometrical configuration of said injector nozzle permits to improve the injection conditions of the reactants into the flowing slurry. Optimizing said parameters therefore allows increasing the productivity of the polymerization reaction.

The present invention will be further disclosed in detail hereunder. The description is only given by way of example and does not limit the invention. The reference numbers relate to the hereto-annexed figures.

DETAILED DESCRIPTION OF THE INVENTION

Figure 1:
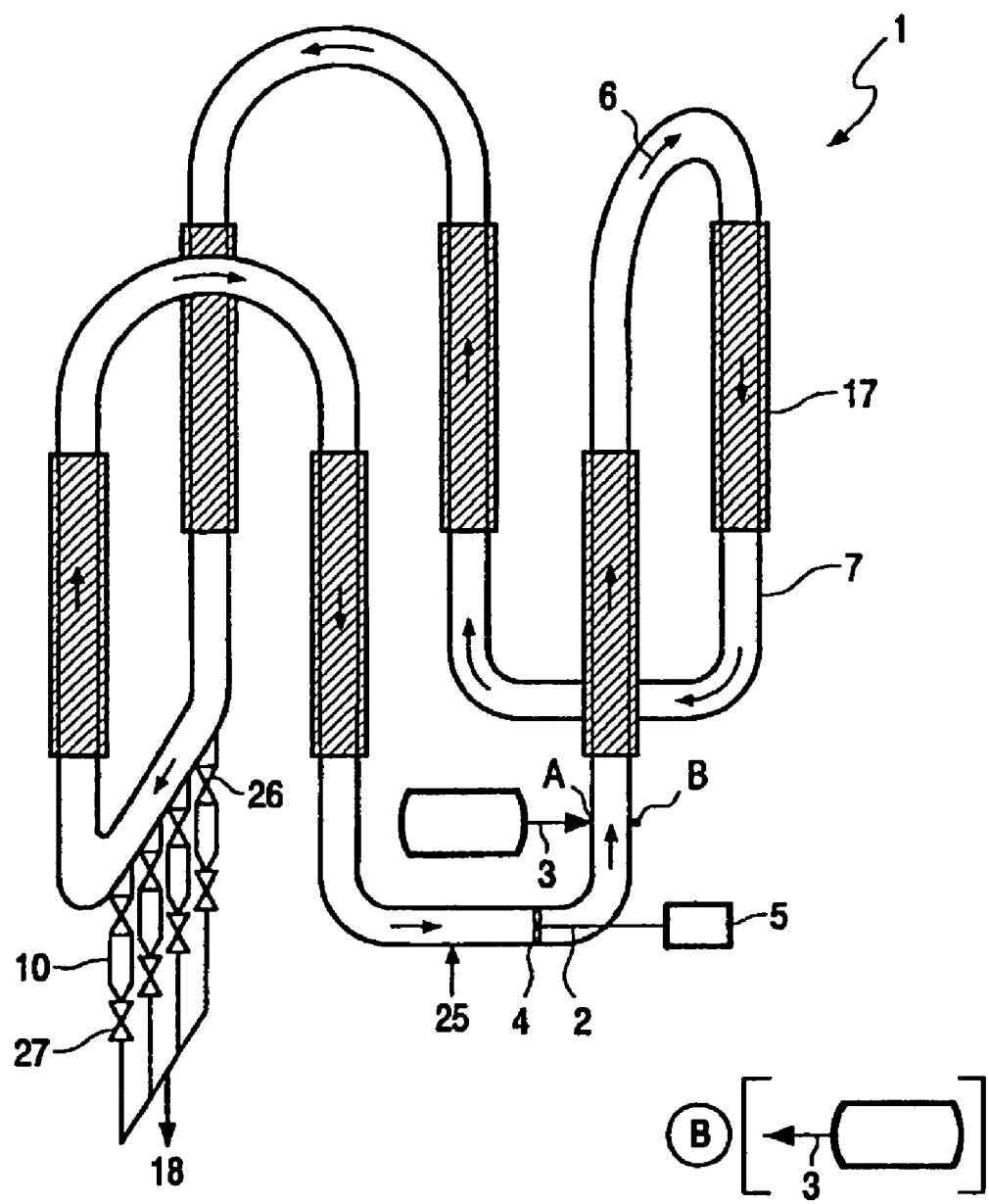
FIG. 1 is a schematic representation of a loop reactor according to an embodiment of the present invention.

The present invention relates to an injector nozzle suitable for injecting reactants into a reactor, preferably a loop reactor, said injector nozzle consisting essentially of a fluid conduit extending into an discharge orifice portion to be connected to an opening in the reactor wherein the passage of the discharge orifice portion has a non-circular cross-section and the passage of the fluid conduit has a circular cross-section.

Referring now to the drawings, non-limiting examples of suitable geometrical configurations for the passages of the injector nozzles according to the invention are illustrated on FIGS. 2, 3, 4, 5.

The passages of the discharge orifice portion as illustrated on FIGS. 2 to 5 have non-circular cross-section with short dimension 2Ry and long dimension 2Rx, wherein Rx is longer than Ry. In an embodiment of the present invention Rx is at least 10% longer than Ry.

Figure 2:
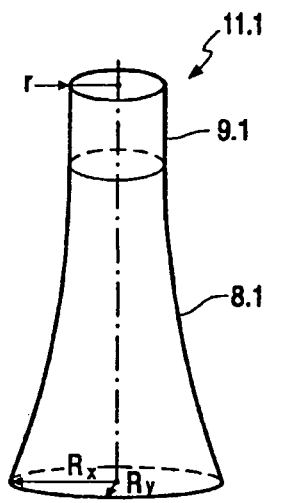
FIGS. 2, 3, 4 and 5 represent perspective views of the passages of injector nozzle according to embodiments of the invention.

FIG. 2 illustrates the passage 11.1 of an injector nozzle according to an embodiment of the present invention, wherein the passage of the fluid conduit 9.1 is circular with a radius r, and is extending through a smooth curved transition into the passage of the discharge orifice portion 8.1 having an elliptical cross-section with a long radius Rx and a short radius Ry.

Figure 3:
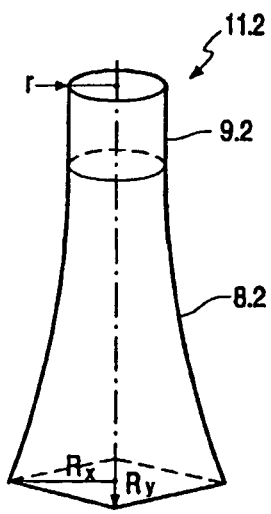

FIG. 3 illustrates the passage 11.2 of an injector nozzle according to an embodiment of the present invention, wherein the passage of the fluid conduit 9.2 is circular with a radius r, and is extending through a smooth curved transition into the passage of the discharge orifice portion 8.2 having a rhombus cross-section with a long diagonal 2Rx and a short diagonal 2Ry.

Figure 4:
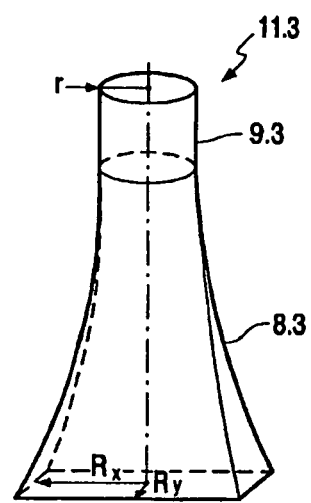

FIG. 4 illustrates the passage 11.3 of an injector nozzle according to an embodiment of the present invention, wherein the passage of the fluid conduit 9.3 is circular with a radius r, and is extending through a smooth curved transition into the passage of the discharge orifice portion 8.3 having a rectangular cross-section with a width 2Rx and a length 2Ry.

Figure 5:
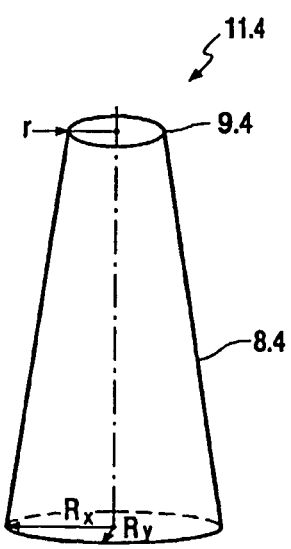

FIG. 5, illustrates the passage 11.4 of an injector nozzle according to an embodiment of the present invention, wherein the passage of the fluid conduit 9.4 is circular with a radius r, and is extending through a smooth straight transition into the passage of the discharge orifice portion 8.4 having an elliptical cross-section with a long radius Rx and a short radius Ry.

Figure 6:
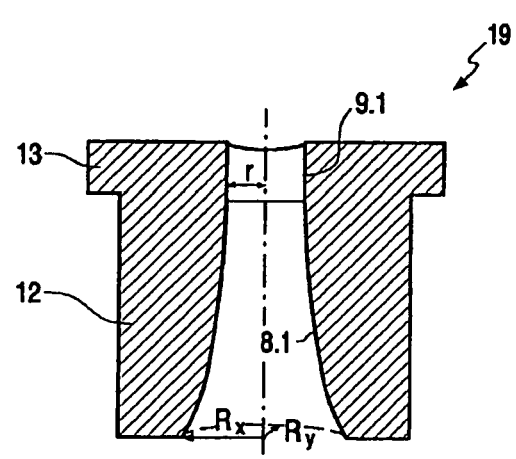
FIG. 6 represents a cross-sectional view of an injector nozzle having the passage of FIG. 2.

FIG. 6 illustrates a cross-sectional view of an injector nozzle 19 according to an embodiment of the present invention defining a passage 11.1 as described in FIG. 2. Said injector nozzle is further provided with a wall 12. In an embodiment of the present invention, the injector nozzle 19 is cylindrical and has a diameter at least 5% longer than 2Rx. In another embodiment as illustrated in FIG. 6, the wall 12 of said injector nozzle 19 may be provided with a flange 13.

As illustrated under FIGS. 2 to 6, the transition from the passage of the fluid conduit into the passage of the discharge orifice portion is smooth, preferably conical or pyramidal. As used herein the term "smooth" refers to a surface with curved or flat planes presenting no sharp angles in the direction of flow when injecting reactants.

In an embodiment of the present invention, the ratio Rx/r may be $\geq 1$. In another embodiment of the present invention, the ratio Ry/r may be $\leq$ to 1. In yet another embodiment, the dimension Rx of the passage of the discharge orifice portion is equal to 0.8 to 5 times the radius r of the passage of the fluid conduit, preferably 1 to 4 times and more preferably 1.5 to 3.5. In a further embodiment, the dimension Ry of the passage of the discharge orifice portion is equal to 1.25 to 0.25 times the radius r of the passage of the fluid conduit, preferably 1 to 0.5 times. In an embodiment of the present invention, Rx is at least 1.1 times longer than Ry and preferably at least 1.5 times. In the present invention, it has to be understood that for all of the above mentioned dimension ratios, the radius r of the passage of the fluid conduit has to be understood as the internal radius of the pipe leading to the nozzle over a distance at least equal to 5 times said radius, without taking into consideration any intermediate larger or smaller pipe section of shorter axial length.

It was surprisingly found that the geometrical configuration together with the ratio of the dimensions Rx/r, Ry/r and Rx/Ry were important for optimizing the introduction, distribution and mixing of said reactants into a slurry circulating into a loop reactor.

In an embodiment of the present invention, although not illustrated herein said injector nozzle according to the present invention may further comprise a device suitable for dispersing gas in the injected reactants, in particular bubbles that could be present therein in a preferred embodiment, the device is a grid or screen, with openings adapted to the flow.

The injector nozzles according to the present invention may be used for the injection of reactants into a reactor suitable for any process producing an effluent comprising a slurry of particulate polymer solids suspended in a liquid medium comprising a diluent and unreacted monomer. Such reaction processes include but are not limited to those which have come to be known in the art as particle form polymerizations.

This invention is particularly suitable for olefin polymerization processes occurring in a loop reactor for the production of polymer, more in particular polyethylene, wherein a polymerization effluent is formed which is a slurry of particulate polymer solids suspended in a liquid medium, ordinarily the reaction diluent and unreacted monomers.

The present invention is particularly suitable for providing an injector nozzle having a suitable geometrical configuration and a suitable position on a reactor for injecting reactants in said reactor and to methods for adequately positioning said injector nozzle on said reactor.

Polymerization processes in such reactors consist of the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 100 bars, preferably at pressure of from 30 to 50 bars, more preferably at pressure of 37 to 45 bars.

In a preferred embodiment, the present invention is particularly suitable in ethylene polymerization process in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene.

Ethylene polymerizes in a liquid diluent in the presence of a catalyst, optionally a co-catalyst, optionally a co-monomer, optionally hydrogen and optionally other additives, thereby producing a polymerization slurry.

As used herein, the term "polymerization slurry" or "polymer slurry" means substantially a multi-phase composition including at least polymer solid particles and a liquid phase and allow for a third phase (gas) to be at least locally present in the process, the liquid phase being the continuous phase. The solids include catalyst and polymerized olefin, such as polyethylene. The liquids include an inert diluent, such as isobutane, with dissolved monomer such as ethylene and optionally one or more co-monomer, molecular weight control agents, such as hydrogen, antistatic agents, antifouling agents, scavengers, and other process additives.

As used herein, the term "reactants" includes the monomers, the inert diluent, and may also include the co-monomers if any, and the molecular weight control agents if any.

Suitable diluents (as opposed to solvents or monomers) are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

Suitable catalysts are well known in the art. Examples of suitable catalysts include but are not limited to chromium oxide such as those supported on silica, organometallic catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

The polymerization is usually performed under slurry conditions, wherein the polymer product consists usually of solid particles and is in suspension in a diluent The slurry is maintained in circulation in a loop reactor comprising vertical jacketed pipe sections connected through elbows. The polymeization heat can be extracted by means of cooling water circulating in the jacket of the reactor. Said polymerization may be performed in a single or in two or more loop reactors, which can be used in parallel or in series. Said reactors operate in a liquid full mode. When used in series they can be connected through means such as for example through one or more settling legs of the first reactor.

The produced polymer may be withdrawn from the loop reactor along with some diluent through at least one settling leg in which the solid content is increased with respect to its concentration in the body of the reactor.

Settling legs may be in continuous fluid connection with the "product recovery zone" or may be separated from such product recovery zone through any device like a valve that allows intermittent fluid communication. As used herein "product recovery zone" includes but is not limited to heated or not heated flash lines, flash tank, cyclones, filters and the associated vapor recovery and solids recovery systems or transfer lines to another reactor or said other reactor when several reactors are connected in series.

When no reactor is present downstream of the sewing legs, the extracted slurry may be depressurized and transferred through for example heated or not heated flash lines to a flash tank where the polymer and the unreacted monomer and/or co-monomers and diluent are separated. The degassing of the polymer may be further completed in a purge column.

When at least one reactor is present downstream of the setting legs, the extracted slurry is transferred through transfer lines to the next reactor. Transfer is made possible by injecting the slurry in the downstream reactor in a point where the pressure is lower than the pressure at the outlet of the settling legs.

Determining a suitable position on the section of the loop reactor allows the correct positioning of injector nozzle on said reactor. Suitable positions are located at the exit of the elbow shaped segment downstream of the pump and along the vertical pipe segment connected thereto in the part of said elbow segment and corresponding pipe, or within the central axis zone of the elbow and the connected pipe thereon. Less appropriate zones are located on the outer side of the curvature of said elbow section and similarly on the vertical pipe connected thereto.

The physical characteristics of the injected reactants encompass the physical states of the reactant, such as if it is a gas or a liquid, or a mixture of both. Other physical characteristics include the reactants viscosity, concentration and flow. Further characteristics encompassed herein include the flow rate, the temperature and the pressure at which said reactants are injected.

Changing the geometrical configuration of the injector nozzle includes but is not limited to changing the form, the dimension and the shape and overall design of said injector nozzle.

Suitable portion of the reactor, where said injection is possible, include portion where the pipes of the reactor are not jacketed. Preferred portion for position said injector nozzle comprises the section downstream of the pump provided in said reactor. The elbow section of a reactor is generally connected to the other part of said reactor through connecting means such as a flange. A suitable portion of the reactor, where said injection is possible is at the exit of the elbow section, particularly on the section between the flange and the jacketed part of the reactor.

In an embodiment of the present invention, the injector nozzle is preferably positioned on said loop reactor at an azimuth with respect to the reactor located on an inner three quarter circle on or at the exit of the elbow section of said reactor, this means not on the 90° angle located for example above the motor of the circulation pump.

Therefore the present invention also relates to the use of an injector nozzle for injecting reactants into a loop reactor, wherein said injector nozzle is connected on an inner three quarter circle on or above an elbow section of the reactor. The injector nozzle is in particular connected on an inner three quarter circle on an elbow section of the reactor or at the exit thereof along the pipe segment connected to said elbow section.

In an embodiment of the present invention, the injector nozzle is preferably connected at the exit of an elbow section at a distance equal to maximum two times the radius of the elbow curvature, preferably at a distance equal to one times the radius of the elbow curvature, and more preferably at the exit of the radius curvature of the elbow.

Not only is the geometrical configuration of said injector nozzle of importance, the positioning of an injector nozzle on the reactor is important with respect to where and how said reactants are introduced into the circulating slurry. Lateral positioning of the discharge orifice portion of said injector nozzle on a vertical pipe of said reactor for example permits to improve the distribution and mixing pattern of said reactants and thereby increases the production of the polymer product.

The present invention encompasses also a loop reactor suitable for olefin polymerization process comprising: a plurality of interconnected pipes defining a flow path suitable for a polymer slurry comprising liquid diluent and solid olefin polymer particles, means for introducing polymerization catalyst and diluent into said reactor, at least one pump suitable for maintaining the polymer slurry in circulation in said loop reactor and one or more setting legs connected to the pipes of said reactor, suitable to allow the polymer slurry to settle therein, and an injector nozzle connected on an inner three quarter circle on or above an elbow section of the reactor.

FIG. 1 schematically illustrates an example of a loop reactor 1 in the use of the invention consisting of a plurality of interconnected pipes 7. It will be understood that while the loop reactor 1 is illustrated with six vertical pipes, said loop reactor 1 may be equipped with less or more pipes, such as 4 or more pipes, for example between 4 and 20 vertical pipes.

The vertical sections of the pipe segments 7 are preferably provided with heat jackets 17. Polymerization heat can be extracted by means of cooling water circulating in these jackets of the reactor. Reactants are introduced into the reactor 1 by line 3 comprising an injector nozzle not shown herein. According to the present invention, the injector nozzle of the line 3 is connected on an inner three quarter circle on or above an elbow section of the reactor, as illustrated by position A. Conventionally the reactants were injected on the outer side of the pipe 7 as illustrated by point B.

Catalyst, optionally in conjunction with a co-catalyst or activation agent, is injected in the reactor 1 by means of the conduct 25. In an embodiment said catalysts can be introduced just upstream from the circulation pump.

The polymerization slurry is directionally circulated throughout the loop reactor 1 as illustrated by the arrows 6 by one or more pumps, such as axial flow pump 2. The pump may be powered by an electric motor 5. As used herein the term "pump" includes any device from compressing driving, raising the pressure of a fluid, by means for example of a piston or set of rotating impellers 4.

The reactor 1 is further provided with one or more setting legs 10 connected to the pipes 7 of the reactor 1. Although 4 settling leg are illustrated in FIG. 1, the present invention encompasses loop reactor comprising one or more setting legs. In an embodiment of the present invention said loop reactor comprises from 1 to 20 settling legs, preferably 4 to 12 settling legs, more preferably 6 to 10 settling legs.

The settling legs 10 are preferably provided with an isolation valve 26. These valves 26 are open under normal conditions and can be closed for example to isolate a settling leg from operation. Further the setting legs can be provided with product take off or discharge valves 27. The discharge valve 27 may be any type of valve, which can permit continuous or periodical discharge of polymer slurry, when it is at least partially open. Polymer slurry settled in the settling legs 10 may be removed by means of one or more product recovery lines 18, e.g. to a product recovery zone.

In an embodiment of the present invention, the injector nozzle when positioned on said loop reactor has preferably an injection direction which makes an angle that may differ from 0° with respect to a plane perpendicular to the main direction of flow in the reactor near the injection site.

Figure 7:
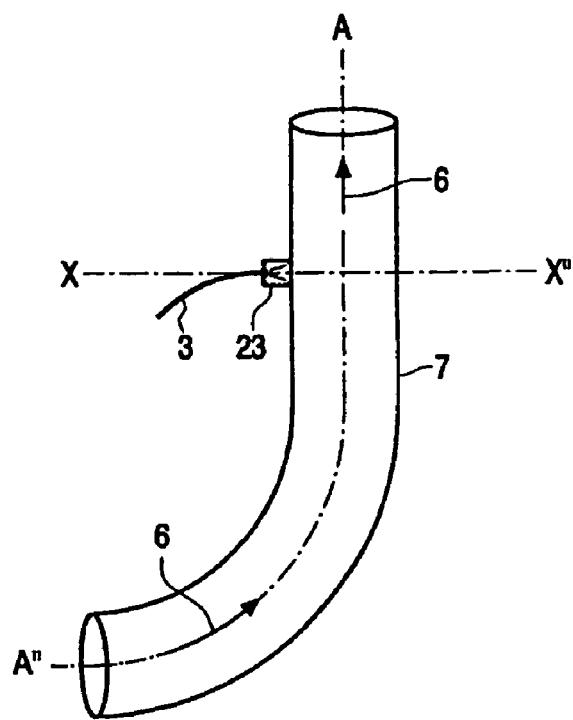
FIG. 7 represents a schematic perspective view of a portion of a loop reactor provided thereon with an injector nozzle according to an embodiment of the present invention.

FIG. 7 schematically illustrates a portion of the pipe 7 of a loop reactor which comprises an elbow part and a straight part, wherein the injector nozzle 23 of the feeding line 3 is connected on an inner three quarter circle above said elbow part.

Figure 8:
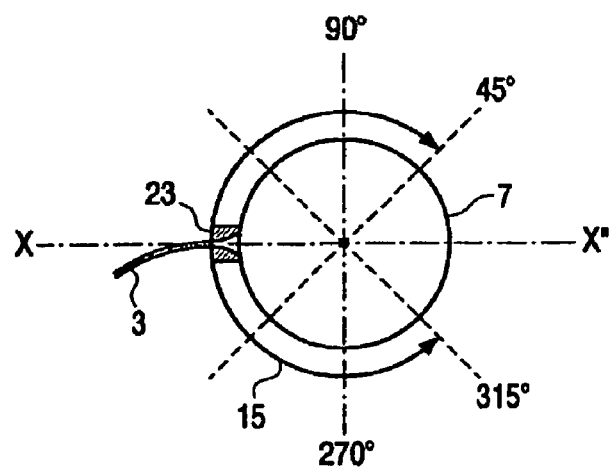
FIG. 8 represents a cross-sectional view along the line X-X" of the portion of loop reactor of FIG. 7.

FIG. 8 represents a cross-sectional view along the line X-X" of the portion of loop reactor of FIG. 7, wherein suitable connecting position for said injector nozzle 23 is illustrated by curve 15. As used herein "inner three quarter circle" include angles comprised between 45° and 315° with respect to the axis X-X", 0° being directed outwards in the median plane of the elbow of the reactor situated nearest to the injection point As illustrated on said FIG. 7, an injector nozzle 23 can be positioned above the elbow section of a loop reactor at an angle comprised between 45° and 315° (FIG. 8). More preferably said injector nozzle 23 may be positioned at an angle comprised between 90° to 270°. Yet more preferably said injector nozzle 23 is positioned at an angle comprised between 120° to 240°, 0° being directed outwards in the median plane of the elbow of the reactor situated nearest to the injection point Moreover although not illustrated herein the angle of attachment of an injector nozzle on the pipe of the loop reactor may be different from 90° with respect to the longitudinal axis A-A" of the pipe.

In another embodiment, the present invention encompasses a loop reactor suitable for olefin polymerization process comprising an injector nozzle according to the present invention. In particular the loop reaction comprises: a plurality of interconnected pipes, means for introducing polymerization catalyst and diluent into said reactor, at least one pump suitable for maintaining the polymer slurry in circulation in said loop reactor and one or more settling legs connected to the pipes of said reactor, and a injector nozzle consisting essentially of a fluid conduit having a passage of circular cross-section extending into a discharge orifice portion having a passage of non-circular cross-section, wherein said discharge orifice portion is connected to said reactor such that the shortest dimension of the passage of said discharge orifice portion is parallel to the direction of the main fluid flow in the reactor at the level of the injection.

Figure 9:
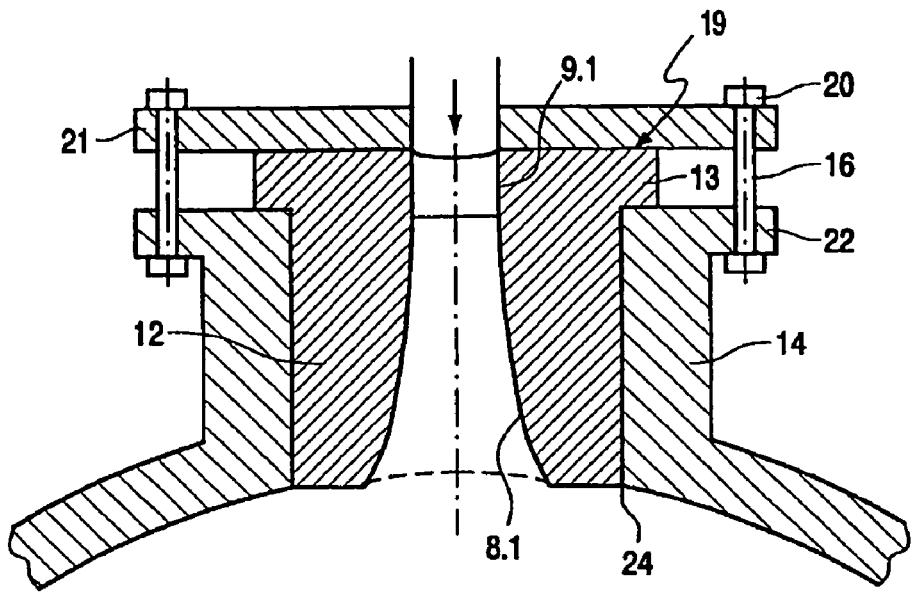
FIG. 9 represents a cross-sectional view illustrating the injector nozzle of FIG. 6 fastened to the loop reactor.

FIG. 9 represents an embodiment of said invention, and shows a cross-sectional view illustrating the injector nozzle 19 of FIG. 6 fastened to the pipe 7 of a loop reactor. The injector nozzle has a cylindrical wall 12 provided with a flange 13 which can be suitably adapted on a housing 14 extending radially from the pipe 7, said housing 14 being in communication with the opening 24 on the pipe 7. Said housing 14 may be further provided with a flange 22. The flange 13 of the injector nozzle can be useful for the fixation of said injector nozzle 19 on the housing 14 through the use of suitable fastening means, such as for example said injector nozzle may be locked to the pipe through the use of a cylindrical plate 21 maintained with bolts 16 and screws 20. Suitable fastening means include but are not limited to bolts, clamps, latch, nail, pin, rivet, screws and the like. The wall of the injector nozzle should preferentially be fabricated so that it does not protrude inside the reactor nor leave any uncovered portion of the housing 14.

In an embodiment of the present invention, the injector nozzle according to the present invention is connected to said reactor such that the shortest dimension Ry of the passage of the discharge orifice portion of said nozzle is parallel to the direction of the main fluid flow in the reactor at the level of the injection.

Figure 10:
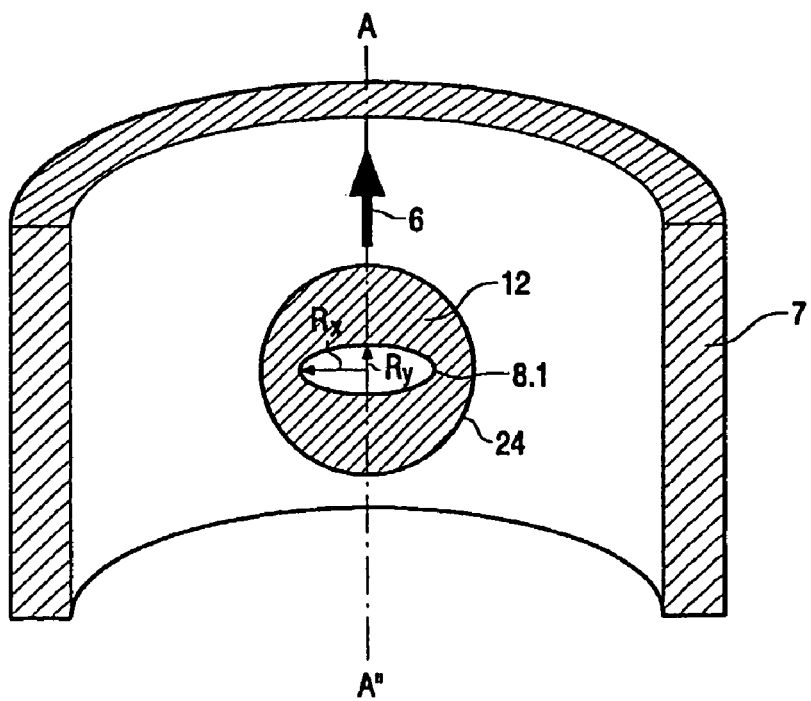
FIG. 10 represents a partial cross-sectional view of a section of a loop reactor whereon the nozzle of FIG. 6 is provided.

Said embodiment is schematically illustrated on FIG. 10 which represents a partial cross-sectional view of a pipe 7 of a loop reactor, having an opening 24, wherein is provided an injector nozzle according to the invention. The injector nozzle has a solid outer wall 12, and comprises a discharge orifice portion 8.1 with a passage of non-circular cross-section. The discharge orifice portion is connected to said reactor such that the shortest dimension 2Ry of said passage is parallel to the direction of the main fluid flow illustrated by lines 6 in the reactor at the level of the injection.

In a further embodiment, the injector nozzle can be used in a multiple loop reactor. For example it can be used in a double loop reactors as depicted on FIG. 11.

Figure 11:
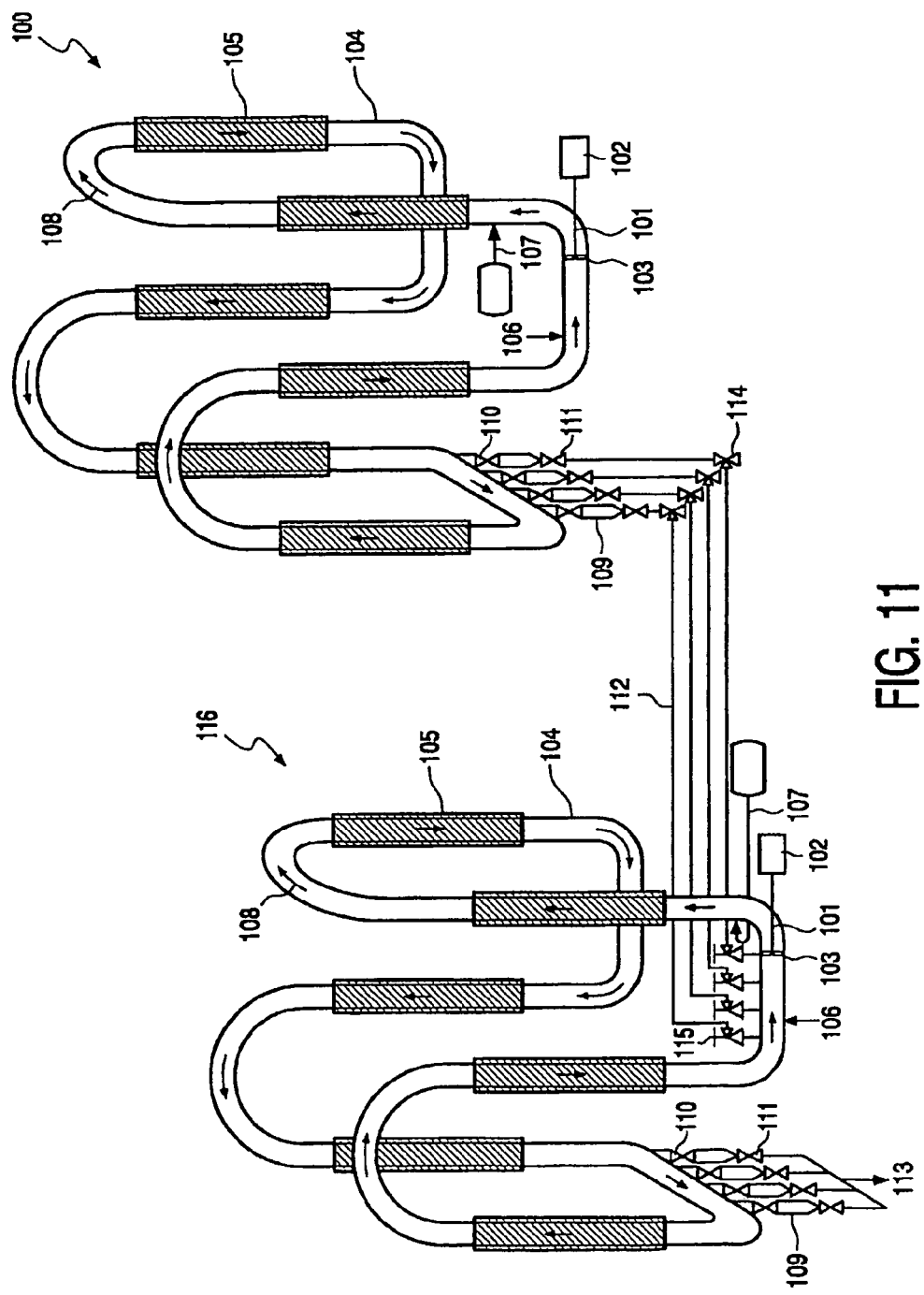
FIG. 11 is a schematic representation of a double loop polymerization reactor.

FIG. 11 represents two single loop reactors 100, 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. According to the present invention, the injector nozzle of said line 107 is connected on an inner three quarter circle on or above an elbow section of said reactors 100 and/or 116. Catalyst, optionally in conjunction with a co-catalyst or activation agent, may be injected in one or both off the reactors 100 and 116 by means of conduct 106. The polymerization slurry is directionally circulated throughout the loop reactors 100 and 116 as illustrated by the arrows 108 by one or more pumps, such as axial flow pump 101. The pumps may be powered by an electric motor 102. The pumps may be provided with set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111 or can be in direct communication with the downstream section. Downstream the exit of the settling leg 109 of reactor 100, a transfer line 112 is provided which allows to transfer polymer slurry settled in the settling legs 109 to the other reactor 116 preferably through a piston valve 115. Along the transfer line 112, a three-way valve 114 may divert the flow to a product recovery zone if the multiple loop reactor has to be used in a parallel configuration. Polymer slurry settled in the settling legs 109 of reactor 116 can be removed by means of one or more product recovery lines 113, e.g. to a product recovery zone.

The appropriate positioning of an injector nozzle surprisingly increases the production in polymer product. This surprising effect can be explained by the longer average time for complete solubilization and dispersion of the reactants in the reactor before extensive reaction takes place. Whilst not wishing to be bound by a theory, conventional positioning of the injector nozzle like in point B of FIG. 1 could be responsible for the earlier triggering of the instabilities and therefore induce a limitation in the production of the polymer product.

The present method permits the improvement of production throughput by the correct positioning of an injector nozzle on a loop reactor. The present method further allows improving the introduction and the mixing of the reactants into said reactor and further determining a suitable geometrical configuration of an injector nozzle permitted to improve the distribution of the reactants in a homogeneous manner.

The method according to the invention permits to combine for an injector nozzle a suitable geometrical configuration with a suitable positioning on the reactor pipe. This allows for the optimization of the introduction and homogeneous distribution of the reactants in the circulating slurring, thereby permitting the increase of the polymerization reaction production.

The present improvement concerning the injector nozzles according to the invention and the use of an injector nozzle in a loop reactor for olefin polymerization as described above allowed the increase of the maximum sustainable solids concentration without occurrence of pump power instability. Furthermore, increased weight percent solids in the loop reactor increases catalyst residence time, increases catalyst productivity. This improved catalyst residence time also improves the particles specific volume, thereby increasing the weight percent solids removed from the reactor, which reduces the diluent processing cost in recycle equipment.

Although the present invention has been described with considerable detail with reference to certain preferred variations thereof, other variations are possible. Therefore, the spirit and scope of the appended claims should not be limited to the preferred variations described herein.

The invention claimed is:

1. A reactor system suitable for olefin polymerization comprising:
   a) a loop reactor having a reactor feed conduct for the introduction of a reactant feed into said reactor and a polymer outlet for the recovery of polymer from said reactor;
   b) a pump in said reactor effective for circulating a diluent carrier liquid and an olefin monomer through said reactor to provide for the polymerization of said olefin monomer to produce a slurry of polymer particles in the diluent carrier liquid; and
   c) an injection nozzle connected to said reactor having an inlet portion connected with a flow passage of a circular cross section connected to said reactor feed conduit and a discharge portion opening into said reactor having a discharge passage of a non-circular cross section.

2. The system of claim 1 further comprising a transition passage extending from said inlet portion to said discharge portion of said nozzle which progressively increases in cross sectional area from said inlet portion to said discharge portion.

3. The system of claim 1 wherein the discharge passage of said injection nozzle has a transverse long axis and a lateral short axis.

4. The system of claim 1 wherein the cross section of the discharge passage of the discharge portion has an elliptical configuration having a short radius $R_y$ and a long radius $R_x$.

5. The system of claim 4 wherein the ratio of the long radius $R_x$ to the short radius $R_y$ is at least 1.1.

6. The system of claim 5 wherein the ratio of long radius $R_x$ to the short radius $R_y$ is at least 1.5.

7. The system of claim 1 wherein the discharge passage of said nozzle has a rectangular cross section having a length $2R_x$ and a width $2R_y$.

8. The system of claim 7 wherein the ratio of the length 2RX to the width 2RY of said discharge passage is at least 1.1.

9. The system of claim 8 wherein the ratio $2R_x/2R_y$ is at least 1.5.

10. The system of claim 1 wherein the cross section of the discharge passage of said injector nozzle is a rhombus having a long diagonal $2R_x$ and a short diagonal $2R_y$.

11. The system of claim 10 wherein the ratio of the long diagonal $2R_x$ to said short diagonal $2R_y$ is at least 1.1.

12. The system of claim 11 wherein the ratio $2R_x/2R_y$ is at least 1.5.

13. The system of claim 1 wherein said discharge section of said injection nozzle has a cross sectional, area which is greater than the cross sectional area of the inlet section.

14. The system of claim 13 wherein said injection nozzle comprises a transition passage extending from the inlet section to the discharge section of said nozzle which progressively increases in cross sectional area from said inlet section to said discharge section.

15. The reactor system of claim 1 wherein the injection nozzle is connected to the loop reactor in an orientation in which the short dimension of the discharge portion is parallel to the direction of the flow of the slurry of diluent liquid and polymer particles in said reactor at the location of said injection nozzle.

16. The system of claim 1 wherein said loop reactor is configured to have a predominantly horizontal section which transitions through an elbow section to a predominantly vertical section.

17. The reactor system of claim 16 wherein said injection nozzle is located on the inside of said elbow section or said predominantly vertical section of said reactor at a position above the elbow section.

18. The system of claim 17 wherein said circulating pump is located in the predominantly horizontal section of said reactor to provide that said injection nozzle is downstream of said pump.

19. The reactor system of claim 1 wherein said loop reactor is configured to have a predominantly horizontal section which transitions through an elbow section into a predominantly vertical section and wherein said injector nozzle is connected to said loop reactor at a location on the inner three-quarter circle of the elbow section or on the predominantly vertical section of the reactor immediately above the elbow section.

20. The reactor system of claim 19 wherein said injector nozzle is connected to said loop reactor at an angular position within an arc of from 90°-270° from a 0° reference on the outside of said reactor.

21. The system of claim 20 wherein said injection nozzle is located within an arc of between 120° and 240°.

* * * * *